United States Patent
Rochette et al.

(10) Patent No.: US 12,014,179 B1
(45) Date of Patent: Jun. 18, 2024

(54) FUNCTION INTERPOSITION IN AN OBSERVABILITY PIPELINE SYSTEM

(71) Applicant: Cribl, Inc., San Francisco, CA (US)

(72) Inventors: Donn Rochette, Fenton, IA (US); John Chelikowsky, Hopkins, MN (US); Ledion Bitincka, San Francisco, CA (US); Clint Sharp, Oakland, CA (US)

(73) Assignee: Cribl, Inc., San Francisco, CA (US)

( * ) Notice: Subject to any disclaimer, the term of this patent is extended or adjusted under 35 U.S.C. 154(b) by 328 days.

(21) Appl. No.: 17/589,002

(22) Filed: Jan. 31, 2022

(51) Int. Cl.
*G06F 1/3206* (2019.01)
*G06F 9/38* (2018.01)
*G06F 9/4401* (2018.01)
*G06F 9/445* (2018.01)
*G06F 9/455* (2018.01)
*G06F 11/34* (2006.01)

(52) U.S. Cl.
CPC .......... *G06F 9/3804* (2013.01); *G06F 9/4401* (2013.01); *G06F 9/44521* (2013.01); *G06F 9/45512* (2013.01)

(58) Field of Classification Search
None
See application file for complete search history.

(56) References Cited

U.S. PATENT DOCUMENTS

| | | | | |
|---|---|---|---|---|
| 2002/0009171 A1* | 1/2002 | Ribo | | H03L 7/0814 375/373 |
| 2007/0220495 A1* | 9/2007 | Chen | | G06F 11/3612 717/130 |
| 2015/0339210 A1* | 11/2015 | Kopp | | G06F 11/3452 718/100 |
| 2017/0161044 A1* | 6/2017 | Singh | | G06F 9/5083 |
| 2019/0182627 A1* | 6/2019 | Thoresen | | H04L 63/045 |
| 2022/0091850 A1* | 3/2022 | Ren | | G06F 9/3842 |
| 2022/0269548 A1* | 8/2022 | Dwivedi | | G06F 11/3006 |
| 2023/0259438 A1* | 8/2023 | Dugas | | G06F 11/3409 709/224 |

OTHER PUBLICATIONS

"AppScope", downloaded from https://github.com/criblio/appscope on Jul. 9, 2021, 4 pgs.
"Cribl AppScope", downloaded on Jan. 28, 2022, from https://cribl.io/appscope/, 5 pgs.

(Continued)

*Primary Examiner* — Hyun Nam
(74) *Attorney, Agent, or Firm* — Henry Patent Law Firm PLLC

(57) ABSTRACT

In some aspects, data collection functions are interposed to generate input data for an observability pipeline system. In some aspects, a data collection function is made available to an application running on a computer system, with the data collection function having the same name as an original function referenced by the application. In response to a call to the original function, the data collection function is executed and data is extracted from the application. The original function is then executed. A reporting thread of the application is executed; executing the reporting thread generates observability pipeline input data by formatting the extracted data and sends the observability pipeline input data from the computer system to an observability pipeline system.

22 Claims, 6 Drawing Sheets

(56) References Cited

OTHER PUBLICATIONS

"Data Sheet—Cribl AppScope", accessed via Internet on Jan. 28, 2022, 2 pgs.
"GOT and PLT for pwning.", https://systemoverlord.com/2017/03/19/got-and-plt-for-pwning.html, Mar. 19, 2017, 8 pgs.
"Hook function calls by inserting jump instructions at runtime", GitHub—kubo/funchook: Hook function calls by inserting jump instructions at runtime, accessed Jan. 28, 2022, 4 pgs.
"PLT and GOT—the key to code sharing and dynamic libraries", downloaded from https://www.technovelty.org/linus/plt-and-got-the-key-to-code-sharing-and-dynamic-libraries.html, dated May 10, 2011, 4 pgs.
"Runtime GOT poisoning from injected shared object", lj.rossia.org/users/herm1t/78510.html, dated Mar. 13, 2015, 2 pgs.
"Tool Interface Standard (TIS) Executable and Linking Format (ELF) Specification", Tool Interface Committee (TIS), dated May 1995, 106 pgs.
Cribl, Inc., online documentation for AppScope, downloaded on Jan. 28, 2022, from https://appscope.dev/docs/tls, 63 pgs.
Bitincka, "How AppScope helped resolve a DNS problem", https://cribl.io/blog/how-appscope-helped-resolve-a-dns-problem/, Apr. 1, 2021, 2 pgs.
Bremer, "x86 API Hooking Demystified", jbremer.org/x86-api-hooking-demystified/, Jul. 2, 2012, 11 pgs.
Huedecker, "Latest AppScope Updates: version 0.7 adds ability to attach to a running process, TLS support, and Alpine Linux support", https://cribl.io/blog/latest-appscope-updates-version-0-7-adds-ability-to-attach-to-a-running-process-tls-support-and-alpine-linux-support/, Jul. 6, 2021, 2 pgs.
Jaroch, "AppScope from an AppDynamics Perspective", https://cribl.io/blog/appscope-from-an-appdynamics-perspective/, Aug. 31, 2021, 3 pgs.
Koshy, "libelf by Example", Jan. 12, 2010, 61 pgs.
Rochette, "AppScope—Tool for Instrumentation and Data Collection; AppScope Design", https://cribl.io/blog/appscope-design/, Apr. 1, 2021, 3 pgs.
Rochette, "AppScope: Analyzing gRPC and Protobuf", https://cribl.io/blog/analyzing-grpc-and-protobuf/, Apr. 1, 2021, 3 pgs.
Rochette, "AppScope: Interposition Mechanisms", https://cribl.io/blog/interposition-mechanisms/, Apr. 1, 2021, 2 pgs.
Rochette, "AppScope: Postgres SQL Observability", https://cribl.io/blog/appscope-postgres-sql-observability/, Apr. 6, 2021, 5 pgs.
Sharp, "Introducing AppScope: Easy Black Box Instrumentation for Everything", https://cribl.io/blog/introducing-appscope-easy-black-box-instrumentation-for-everything/, Apr. 1, 2021, 4 pgs.

* cited by examiner

FUNCTION INTERPOSITION IN AN OBSERVABILITY PIPELINE SYSTEM

BACKGROUND

The following description relates to function interposition in an observability pipeline system.

Observability pipelines are used to route and process data in a number of contexts. For example, observability pipelines can provide unified routing of various types of machine data to multiple destinations, while adapting data shapes and controlling data volumes. In some implementations, observability pipelines allow an organization to interrogate machine data from its environment without knowing in advance the questions that will be asked. Observability pipelines may also provide monitoring and alerting functions, which allow systematic observation of data for known conditions that require specific action or attention.

DETAILED DESCRIPTION

Figure 1:
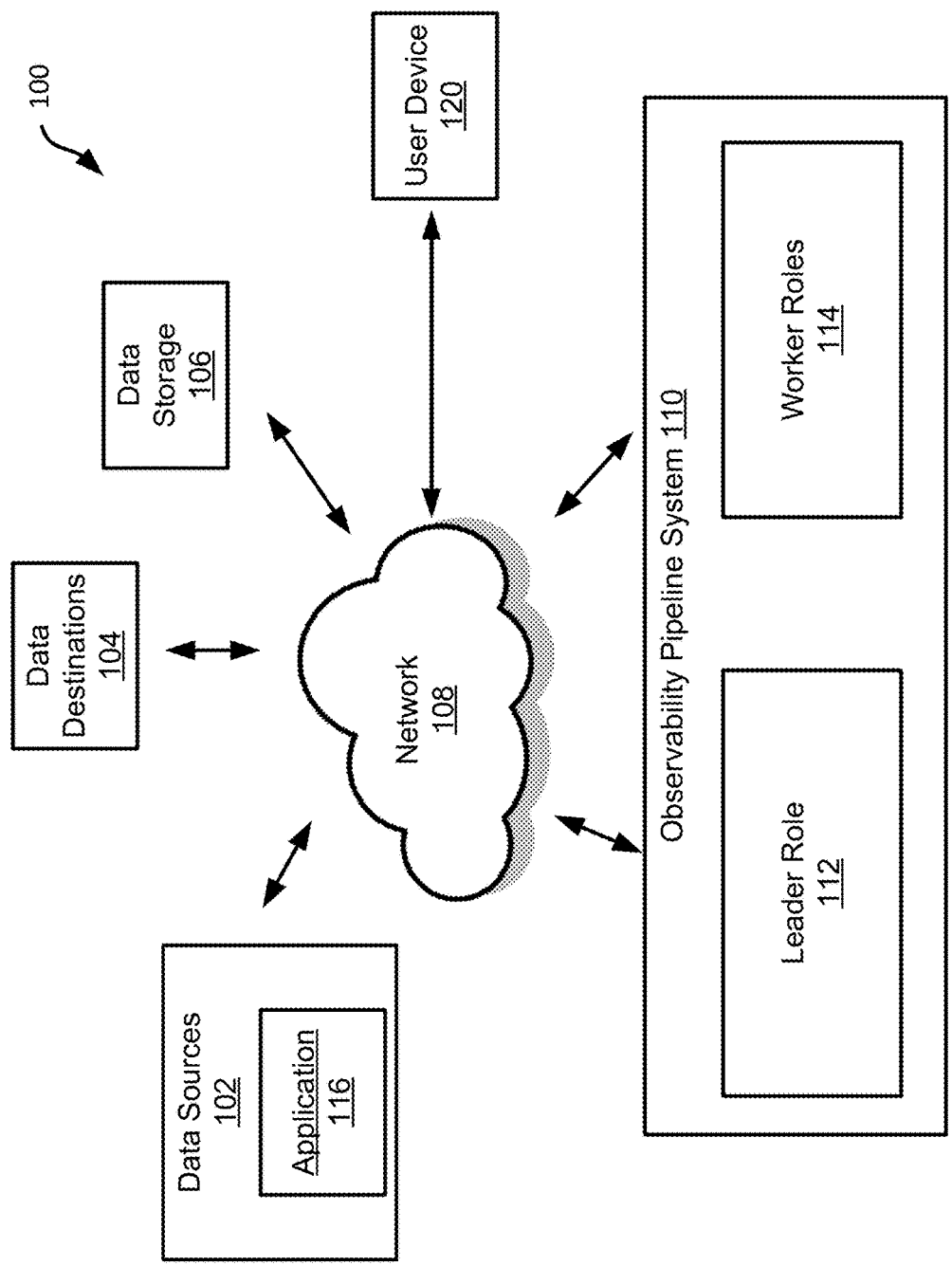
FIG. 1 is a block diagram showing aspects of an example computing environment that includes an observability pipeline system.

In some aspects of what is described here, data from applications is processed in an observability pipeline system. In some implementations, interposed function wrappers may intercept application calls to library and application functions, perform data collection, then pass control to the original functions. Information obtained from data collection can be stored, e.g., in memory, and subsequently processed by an independent thread. This thread can operate over a configured period (e.g., ten seconds or another period of time), format the stored data, and export it to external systems. As part of the formatting, the stored data can be filtered, reduced, and redacted. For example, the stored data may be filtered for troubleshooting or analysis, converted to metrics, superfluous fields or unnecessary data may be dropped, logs or log lines may be sampled, or other types of filtering may be performed while preserving the original event data. The output can then be delivered to any destination.

The systems and techniques described here can provide technical advantages and improvements over existing technologies. As an example, interposing functions for data collection may allow the extraction of data without modifying existing applications. Furthermore, function interposition may be established against an executing process. Additionally, processing the extracted data with a reporting thread may allow the applications to avoid incurring the time and CPU overhead that would occur if the applications had to incorporate this processing in-line. The ability to collect data from third-party applications, format it, and deliver it to an analytics tool can provide tremendous flexibility in how machine data is processed in the first place. This can allow enterprise computer systems to extract value from machine data while conserving computing resources. Accordingly, aspects of the systems and techniques described here can be used to improve the operation of computer systems, information and data management systems, observability pipeline systems, and other classes of technology.

By using function interposition, additional functionality can be added to an application without requiring changes to the application or the application code. This additional functionality can include mechanisms for instrumenting the operation of the code, both within the application program as well as with other components, (e.g., storage devices) accessed by the application. This instrumentation can provide developers and administrators with insights regarding the operation of the application within a production environment that may not be available prior to deployment. Additionally, site reliability engineers, development operations teams, and software engineers in Information Technology settings can use the instrumentation to obtain visibility of applications in varied settings.

Examples of technical advantages and improvements can include: enabling users to explore, understand, and gain visibility of running applications with no code modification; providing fine-grained observability of a proxy/service mesh, without the latency of a sidecar; emitting application specific metric and event data, in open formats, to existing log and metric tools; supporting consumable output for events including, but not limited to, file access, DNS, and network activity; supporting industry standard data formats such as StatsD and JSON; enabling runtime-agnostic views of applications without dependencies and without required code development; supporting static executables; enabling application events to be captured, including console content, STDIN/STOUT, logs, and errors; enabling the capture of application payloads such as DNS, HTTP, and HTTPS; providing the ability to summarize metrics and detect protocols; and allowing the normalization and forwarding of metrics and events, in real time, to remote systems.

Function interposition is a concept of replacing calls to functions with calls to user-defined wrappers. Several approaches to function interposition can be used in various cases. Examples include library preloading, function hooking, and Global Offsets Table (GOT) hooking.

Interposing a function call can imply that an application is unaware, or at least does not need to be aware, of the interposition. Within an application, a call to a named function can ultimately result in a call to a particular address in computer memory. In an example, the executable code at the specified location is executed, and the function returns to the caller. With interposition, the application transfers control to a second (interposed) function, the interposed function executes, e.g., extracts performance information, and can then call the original function. The original function executes, then returns control back to the calling application. In some cases, the original function returns an output to the application. In an example, the original caller continues to execute as if the interposition never happened.

In some cases, an unmodified executable is instrumented using interposition. In an example, single-user troubleshooting is performed. In other cases, distributed deployments are monitored. Unmodified Linux executables can be similarly instrumented. In some cases, applications can operate in user mode, with no kernel component.

Many operating systems provide and differentiate between user mode and kernel mode, which may also be referred to as application mode and system mode. In kernel mode, executing code has unrestricted access to the underlying hardware and may be able to execute any CPU instruction or reference any memory address. Kernel mode is generally reserved for low-level, trusted functions of the operating system. Problems occurring while executing in kernel mode can be catastrophic and may halt the computer.

By contrast, code executing in user mode is usually prevented from directly accessing hardware or referencing memory and must make requests to do so through system APIs (application programming interfaces). Generally, applications execute in user mode and transition to kernel mode when they need to perform a system call, e.g., read from or write to disk. As such, applications are limited in their ability to perform operations that could affect the overall system or other applications. For example, applications executing in user mode can be constrained as to the files they can access and the amount of CPU, memory, or other resources they may consume.

In some circumstances, a kernel module may be added to the operating system. A kernel module is third-party code that can be added to, or loaded, in an operating system and executes with kernel mode privileges. Among the advantages of executing code in kernel mode is the ability to access any application running on the system, which could simplify the extraction of application detail for use in an observability pipeline. However, the technical and governance issues that can be associated with modification to an operating system are such that many IT organizations prohibit the use of third-party kernel modules. Function interposition, executing in user mode, can extract detailed information from applications in production environments as inputs to an observability pipeline.

An application, or executable, can include modules that are specific to the application, modules from other applications, and modules from the underlying operating system. Executables may also be referred to as programs. Code from modules external to an executable can be grouped and presented as a library. Libraries can then be "linked" to the executable. Libraries can be static or dynamic. Static libraries, while usable by multiple executables, are locked into a program at compile time. On the other hand, dynamic (or shared) libraries exist as separate objects outside of the executable file. Typically, a static library's code cannot be modified without recompiling. In contrast, a dynamic library can be modified without having to recompile any dependent programs. Furthermore, in the case of a dynamic library, multiple running applications can use a shared copy of the library rather than each application having its own copy. An application can make calls to functions within the library or within its own executable. In various examples, any of these function calls can be interposed. In some cases, a library can be created or configured through a command line user interface.

A library can represent a core component of application processes, containing functions that extract data as an application executes. In some cases, library behavior is configurable using environment variables or a configuration file. In some cases, interposing function calls requires no change to an application. In an example, it works with unmodified binaries, and the CPU and memory overhead is minimal. A library can be loaded using different mechanisms, depending on the type of executable. In one example, a dynamic loader can preload a library. In another example, a static executable can be loaded using a defined loader. In some cases, child processes can be created using a library, if the library was available to the parent. In some cases, a single executable is able to create any number of children, all of which can include interposed functions. In some examples, a library can be used independently, making use of a configuration file and environment variables. In some cases, environment variables take precedence over a default configuration, as well as application-specific configuration files.

Library preloading can be a feature of dynamic linkers/loaders, (e.g., in conjunction with a library "ld.so," or in another context) and can be available on many UNIX-based and Windows systems. A preload feature can allow a user-specified shared library to be loaded before other shared libraries required by an executable.

In some cases, a dynamic linker can resolve external addresses for an executable, using the symbol namespace of libraries as they are loaded. In some implementations, the linker populates the symbol namespace in library load order. For example, an application may call a function "fwrite" to write data to a file. The function "fwrite" can be part of a library, e.g., "libc," provided by an operating system. In some implementations, a linker or dynamic loader will determine the address in memory where "fwrite" can be accessed. If a library includes the function "fwrite," an entry for "fwrite" will be placed in the symbol table. The address for "fwrite" can be determined when the library is loaded, and the linker then uses that address to resolve any references to "fwrite."

As an example, if an application uses "fwrite," it may have a dependency on the "libc.so" library because that is often the location to which the function "fwrite" will be resolved when the application is built. In some implementations, a dynamic loader will resolve the address to "fwrite" when "libc.so" is loaded. However, in some cases, if a library is preloaded before "libc.so," and the preloaded library defines a function "fwrite," the dynamic linker will resolve "fwrite's" address to that of the version in the preloaded library instead of using the address of "libc: fwrite." As a result, the function "fwrite" has been interposed. It is now up to the interposed "fwrite" function to locate the address of "libc.so:fwrite," so that it can (in turn) call "libc.so:fwrite." In some cases, a call to the interposed "fwrite" consequently results in the execution of "libc.so: fwrite," which can execute and return its results to the caller. In some cases, the interposed "fwrite" extracts detail about the write operation.

Library preloading supports interposing functions of dynamically loaded libraries, in which a dynamically loaded library contains the function to be interposed. Library preloading would not typically be used to interpose functions provided by an application itself, nor would it be used against a statically linked executable.

Another type of function interposition is Global Offset Table (GOT) Hooking. GOT Hooking can be used when an application loads libraries itself, independently of the dynamic loader. For example, the Python interpreter loads libraries in support of import statements. Additionally, Apache loads libraries as a part of module management, as defined in configuration files. GOT hooking can be used to interpose functions deployed in any of these application-loaded libraries.

In some examples, a dynamic linker uses a Procedure Linkage Table (PLT) to enable calling of external functions. In some cases, the complete address resolution is accomplished by the dynamic linker when an executable is loaded. The GOT can be used to resolve addresses in conjunction with the PLT. The PLT typically includes the code that gets executed when an external function is called, while the GOT typically includes data that defines the actual function address.

Applications may call functions that are embodied in objects, e.g., shared libraries, that are external to the application itself. An operating system can provide many shared libraries. An objective can be to relieve an application from a need to duplicate common functionality.

The PLT represents code to be executed when an external function is called by an application. Code in the PLT references a specific entry in the GOT. The GOT entry, in turn, represents the memory address of the function to be called by the application. Together the PLT and GOT create the capability for dynamic linking of functions with an application.

In an example, an application includes a call to a function fwrite( ) that writes a string to a file. This functionality is not inherent in the application code. In the example, the fwrite( ) code is embodied in a shared library known as libc.so. When the application is compiled, the memory address associated with the call to fwrite( ) is marked as unknown. At the time the application is compiled, the specific location of an external fwrite( ) function is unknown. However, the application object includes a reference to an external shared library named libc.so. It is expected that a dynamic loader will load the application and any referenced external shared libraries. In this case the shared library libc.so is expected to be loaded along with the application.

In the example, upon execution of the application, the dynamic linker/loader (ld.so in Linux terminology) first loads the application itself and then the shared library libc.so. The dynamic linker/loader then creates and loads the PLT, which (because the application does not contain an fwrite( ) function) contains a PLT entry representing the fwrite( ) function. The dynamic linker/loader then resolves the address of fwrite( ) in libc. The memory address of libc:fwrite( ) is then updated in the corresponding entry in the GOT. The dynamic linker/loader replaces the address of any fwrite( ) calls in the application with the address of the PLT entry for fwrite( ). Consequently, when the application calls the function fwrite( ) it is calling code in the PLT. The PLT code references an entry in the GOT for fwrite( ) and executes the actual fwrite( ) call in libc.so.

In some examples, a dynamic loader can use what is known as lazy binding. By convention, when a dynamic linker loads a library, it will put an identifier and a resolution function into known places, or addresses, in the GOT. In some cases, a first call to an external function uses a call to a default stub in the PLT. The PLT loads the identifier and calls into the dynamic linker. The linker resolves the address of the function being called, and the associated GOT entry is updated. The next time the PLT entry is called, it will load the actual address of the function from the GOT, rather than the dynamic loader lookup. To interpose a function using GOT Hooking, an entry in the GOT is replaced with the address of the function that will perform the interposition.

In some cases, the original function may be part of a statically linked executable. In other cases, the original function may be part of the application or a module of the application source code. Function hooking is another type of interposition and can be used to implement function interposition in statically linked executables, such as Go applications. It can be accomplished by modifying code that implements the function to be interposed. In some cases, function hooking places a "JMP" (jump) assembly language instruction in the function to be interposed. The "JMP" causes a redirection to the address of the interposed function. The actual modification depends on the hardware architecture and instruction definition.

The JMP instruction may be placed in the function preamble, the beginning of a compiled function. Depending on the desired outcome and the definition of the function to be interposed, the JMP instruction could be inserted at other points, e.g., where the function returns, or in other locations.

For example, a Go compiler can create a common function preamble that causes the stack to be checked for size and validity. The compiler enables the stack to be increased or decreased in size and performs a check of functions that have been called prior to the current function. The stack re-size and the validity check can result in errors if a JMP instruction is inserted in the preamble of a Go function. However, if a JMP instruction is instead inserted at the point where the function to be interposed returns to the caller, errors can be avoided. The intended interposition behavior is maintained in the case where the JMP, or redirection, is inserted on a return as compared to a preamble.

In some examples concerning statically linked executables, a loader component can be provided. In some cases, the loader allows configurability via a configuration file. For example, the configuration file can specify information export using UDP, TCP, and local or remote connections.

To update code, function hooking may write to memory in executable space. Many operating systems provide separate areas of memory for a program's executable code and its data, and further provide a linker/loader that works in concert with this separation. In some implementations, the linker/loader establishes access permissions for segments of memory into which parts of an application are loaded. For example, a segment of memory containing code (instructions) to be executed may have read and execute (but not write) permissions, while a segment of memory intended to contain variables (data) may possess read and write (but not execute) permissions. Thus, data can be written to a stack or heap, modified, and read, but (the segment of memory containing) that data may not be executed. In some implementations, the linker/loader applies these permissions and the computer hardware, e.g., the CPU, enforces them.

To employ function hooking, instructions in memory may need to be modified. If these instructions reside in a segment of memory prohibiting modification, the permissions for that segment will need to be updated to allow update. In many implementations, the CPU prevents application code, executing in user mode, from changing permissions for a segment of memory. However, if the application is able to enter kernel mode, the necessary privileges can be obtained. In some implementations, an application uses a system call mechanism to transition from user mode to kernel mode. An example of such a system call, provided by many UNIX systems to change the access permissions of memory segments, is mprotect( ).

Thus, in some implementations employing function hooking, mprotect( ) can be used to modify memory segments containing executable code or instructions. In such implementations, mprotect( ) is first used to grant write/update permissions for the segments containing the relevant instructions. Then, the segment is modified to accommodate the interposing function. Upon completion of the modifications, mprotect( ) is applied again to restore the original access permissions of the segment.

In some cases, changing permissions in memory is accomplished on page boundaries. The page associated with the function to be interposed can be given write permissions, the code to be interposed is modified with the "IMP" instruction, and the write permissions are revoked.

In addition to loading the library and interposing functions when a process starts, interposition can be established against a running process. In some implementations, the running (remote) process is attached by a supervising application using the name of the remote process or its process identifier. In some implementations, attaching to a process includes intercepting input to and output from the process so as to modify the input, operation, and output of the process. In some implementations, the state of the remote process (which can include the values of the program counter, any registers, any variables, or other attributes) is determined and saved. Then, bootstrapping code to load and control an interposition library is placed into executable memory of the remote process. In some implementations, this is achieved using mprotect( ), as described above. The state of the remote process is then modified, e.g., the register values are modified, to cause the inserted bootstrap code to execute. In some implementations, this results in the interposition library being loaded into executable memory of the remote process and the execution of a constructor function that instantiates and initializes the interposed functions.

In some implementations, state of the remote process is then restored and the remote process is allowed to continue executing from the point at which it was stopped when the "attach" occurred. The supervising process then "detaches" from the remote process and the interposed functions in the remote process begin to capture and emit details describing execution of the process that was attached.

In some implementations, an operating system-supplied feature known as "ptrace" can be used to attach, detach, read/write memory and read/write registers from the remote process. In some examples, ptrace is executed with root/administrator privileges.

In some implementations, the attach mechanism writes a snippet of executable code into the address space of the remote process, executes that code, and regains control after the code snippet completes. The intent of the snippet is to load the interposition library and cause the library constructor to execute.

The actual write of the code snippet can be accomplished with "ptrace." In order to execute the snippet it should reside in executable memory in the remote process. In practice, locating an adequately sized block of executable memory in a memory segment of the remote process can be accomplished in several ways. Some implementations map additional memory in the remote process. A challenge with this implementation is to either execute code in the remote process that will allocate sufficient memory or map additional memory for the remote process outside of the process itself.

Another implementation examines the memory map of the remote process, locates a page of executable memory, reads and saves the memory content of the located page, writes the snippet into the located page, causes the snippet to be executed, and upon completion of the snippet completes and return of control back to the supervising application, restores the original memory content. This implementation can be realized on multiple OS distributions and CPU architectures.

In some implementations, the snippet calls a dynamic loader function dlopen( ) and returns control back to the supervising application. The function dlopen( ) can take a parameter of the path name of a shared library. In some implementations, dlopen( ) loads the library and calls a constructor function in the loaded library if one is defined.

A string representing a path name is then written to the located segment of executable memory in the remote process. The pathname is passed as a parameter to dlopen( ). In some implementations, function parameters are passed in registers. For such a case, the appropriate CPU register, as defined by the architecture, can be updated with the address of the path name. The instruction pointer register is updated with the address of the snippet and a "ptrace" continue call is made, resulting in the remote process executing the snippet.

The snippet can include an interrupt instruction to cause control to be passed back to the supervising application. The specific instruction can be CPU architecture dependent. When dlopen( ) returns, the interrupt instruction can be executed, causing the remote process to stop all execution and return control to the supervising application.

In some implementations, loading the library causes the dlopen( ) function to cause a library constructor to execute. As part of the execution of the constructor, a number of functions of the remote process can be interposed. The interposition mechanism utilized in the attach case can be GOT hooking. Applying updates to the GOT can cause the application code in the remote process to call the interposed function in the newly loaded library as opposed to the original function. A result can be that the remote process is interposed and behaves in the same manner as it would using a preload mechanism at process start.

In some instances, all state is restored in the remote process when the supervising application updates the original saved state. The remote process can then continue from the point at which the attach occurred.

Information extracted from interposed functions can be processed in a variety of ways. In some implementations, the extracted information is stored in an in-memory queue. In some implementations, the extracted information is stored in a file on disk, or through other mechanisms. Updating information in-memory can improve performance by avoiding I/O or inter-process communication (IPC) overhead to extract details from an application. The extracted detail can be stored and control returned to the calling function.

A reporting thread can emit the extracted information for use by external systems and analysis. Such a thread can execute over a configured period (e.g., every ten seconds, every twenty seconds, or another period of time). In some cases, the thread reads from an in-memory queue and exports the information as formatted data. Events and metrics can be exported. Events can be key/value pairs that describe something that occurred on the system at a particular point in time. Events can represent several types of application activity, e.g., detailed application behavior such as network connections, network send or receive operations, file open/close, file read/write, writes to the console (e.g., STDIN and STDOUT), and writes to log files. In addition, the protocols associated with network traffic can be examined. Events can be generated when a particular protocol is used by an application, and the payload content of a protocol can be extracted and exported as an event. In an example, the payload of a packet transmitted or received with HTTP can be reported as an event. Events associated with the individual executions of interposed functions can be obtained. By contrast, metrics can report on duration (timers) or a number of invocations (counters) associated with multiple executions of interposed functions. Metrics can be exported in different formats. In some implementations, metrics are exported in StatsD format. In other cases, metrics are exported in NDJSON format. Events can also be part of the extracted detail. In some cases, events are exported in NDJSON format. In some implementations, metrics can be exported to a network connection or file.

Information can be input to various systems. For example, metrics in StasD format can be sent to DataDog, logs in NDJSON form can be sent to Splunk, and events can be sent to New Relic. In some implementations, information can be filtered, reduced, redacted, formatted, and delivered.

FIG. 1 is a block diagram showing aspects of an example computing environment 100 that includes an observability pipeline system 110. In addition to the observability pipeline system 110, the example computing environment 100 shown in FIG. 1 includes data sources 102, data destinations 104, data storage 106, network 108, and a user device 120. The data sources 102 includes an application 116. The computing environment 100 may include additional or different features, and the elements of the computing environment 100 may be configured to operate as described with respect to FIG. 1 or in another manner.

In some implementations, the computing environment 100 contains the computing infrastructure of a business enterprise, an organization or another type of entity or group of entities. During operation, various data sources 102 in an organization's computing infrastructure produce volumes of machine data that contain valuable or useful information. These data sources can include applications 116. The machine data may include data generated by the organization itself, data received from external entities, or a combination. By way of example, the machine data can include network packet data, sensor data, application program data, observability data, and other types of data. Observability data can include, for example, system logs, error logs, stack traces, system performance data, or any other data that provides information about computing infrastructure and applications (e.g., performance data and diagnostic information). The observability pipeline system 110 can receive and process the machine data generated by the data sources 102. For example, the machine data can be processed to diagnose performance problems, monitor user interactions, and to derive other insights about the computing environment 100. Generally, the machine data generated by the data sources 102 does not have a common format or structure, and the observability pipeline system 110 can generate structured output data having a specified form, format, or type. The output generated by the observability pipeline system can be delivered to data destinations 104, data storage 106, or both. In some cases, the data delivered to the data storage 106 includes the original machine data that was generated by the data sources 102, and the observability pipeline system 110 can later retrieve and process the machine data that was stored on the data storage 106.

In general, the observability pipeline system 110 can provide a number of services for processing and structuring machine data for an enterprise or other organization. In some instances, the observability pipeline system 110 provides schema-agnostic processing, which can include, for example, enriching, aggregating, sampling, suppressing, or dropping fields from nested structures, raw logs, and other types of machine data. The observability pipeline system 110 may also function as a universal adapter for any type of machine data destination. For example, the observability pipeline system 110 may be configured to normalize, denormalize, and adapt schemas for routing data to multiple destinations. The observability pipeline system 110 may also provide protocol support, allowing enterprises to work with existing data collectors, shippers, and agents, and providing simple protocols for new data collectors. In some cases, the observability pipeline system 110 can test and validate new configurations and reproduce how machine data was processed. The observability pipeline system 110 may also have responsive configurability, including rapid reconfiguration to selectively allow more verbosity with pushdown to data destinations or collectors. The observability pipeline system 110 may also provide reliable delivery (e.g., at least once delivery semantics) to ensure data integrity with optional disk spooling.

The data sources 102, data destinations 104, data storage 106, observability pipeline system 110, and the user device 120 are each implemented by one or more computer systems that have computational resources (e.g., hardware, software, firmware) that are used to communicate with each other and to perform other operations. For example, each computer system may be implemented as the example computer system 600 shown in FIG. 6 or components thereof. In some implementations, computer systems in the computing environment 100 can be implemented in various types of devices, such as, for example, laptops, desktops, workstations, smartphones, tablets, sensors, routers, mobile devices, Internet of Things (IoT) devices, and other types of devices. Aspects of the computing environment 100 can be deployed on private computing resources (e.g., private enterprise servers, etc.), cloud-based computing resources, or a combination thereof. Moreover, the computing environment 100 may include or utilize other types of computing resources, such as, for example, edge computing, fog computing, etc.

The data sources 102, data destinations 104, data storage 106, observability pipeline system 110, and the user device 120 and possibly other computer systems or devices communicate with each other over the network 108. The example network 108 can include all or part of a data communication network or another type of communication link. For example, the network 108 can include one or more wired or wireless connections, one or more wired or wireless networks, or other communication channels. In some examples, the network 108 includes a Local Area Network (LAN), a Wide Area Network (WAN), a private network, an enterprise network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

The data sources 102 can include multiple user devices, servers, sensors, routers, firewalls, switches, virtual machines, containers, or a combination of these and other types of computer devices or computing infrastructure components. The data sources 102 detect, monitor, create, or otherwise produce machine data during their operation. The machine data are provided to the observability pipeline system 110 through the network 108. In some cases, the machine data are streamed to the observability pipeline system 110 as pipeline input data.

The data sources 102 can include data sources designated as push sources (examples include Splunk TCP, Splunk HEC, Syslog, Elasticsearch API, TCP JSON, TCP Raw, HTTP/S, Raw HTTP/S, Kinesis Firehose, SNMP Trap, Metrics, and others), pull sources (examples include Kafkaj, Kinesis Streams, SQS, S3, Google Cloud Pub/Sub, Azure Blob Storage, Azure Event Hubs, Office 365 Services, Office 365 Activity, Office 365 Message Trace, Prometheus, and others), and other types of data sources. The data sources 102 can also include other applications 116.

Figure 6:
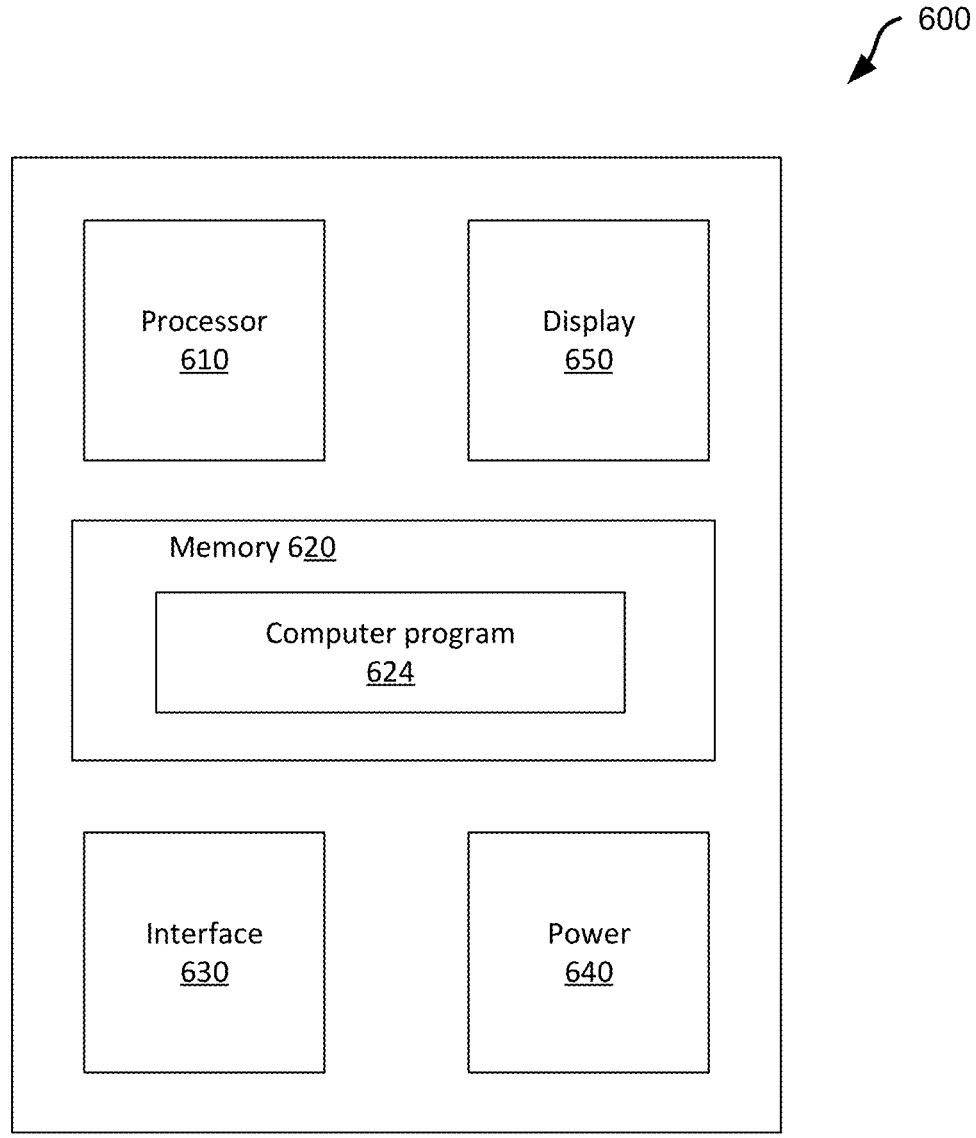
FIG. 6 is a block diagram showing an example computer system.

In the example shown in FIG. 1, the application 116 includes a collection of computer instructions that constitute a computer program such as the computer program shown in FIG. 6. The computer instructions reside in memory 620 and execute on a processor 610. The computer instructions can be compiled or interpreted. An application 116 can be contained in a single module or can be statically or dynamically linked with other libraries. The libraries can be provided by the operating system or the application provider. The application 116 can be written in a variety of computer languages, including Java, "C," "C++," Python, Pascal, Go, or Fortan as a few examples.

Figure 3:
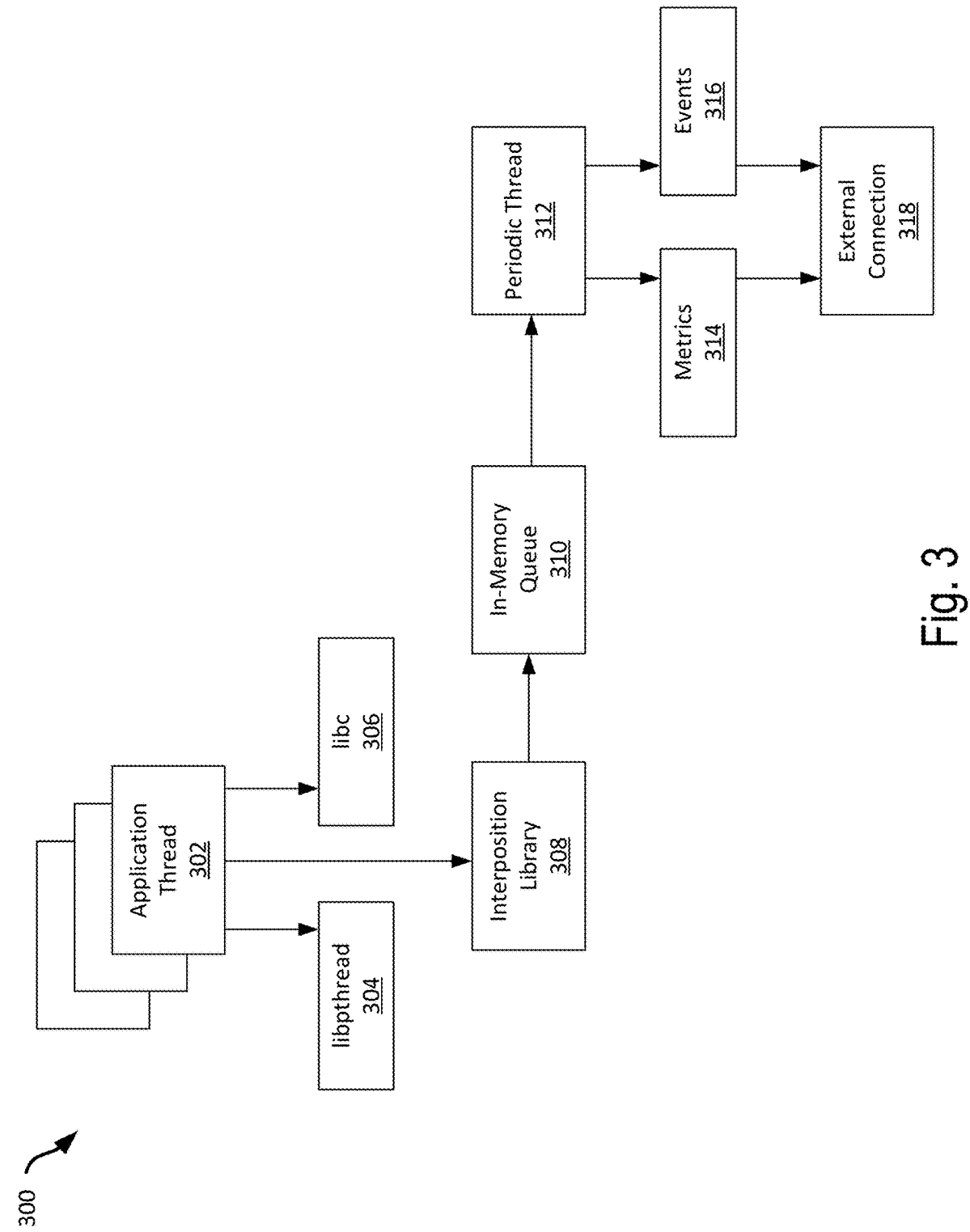
FIG. 3 is a block diagram of an example system for extracting observability data from an application.
Figure 4:
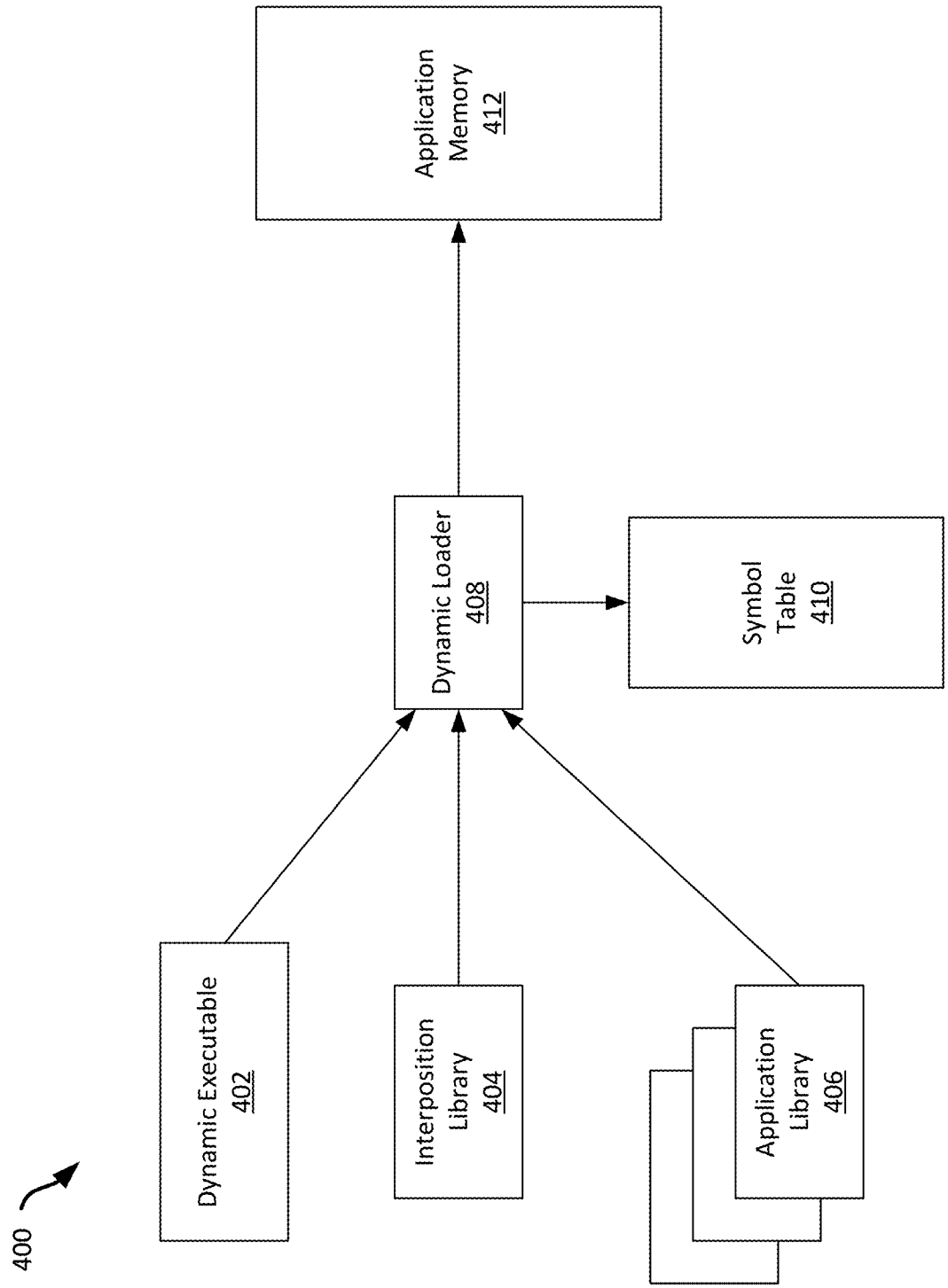
FIG. 4 is an example software architecture of a shared library utilized as part of a mechanism exposing observability data from within applications.
Figure 5:
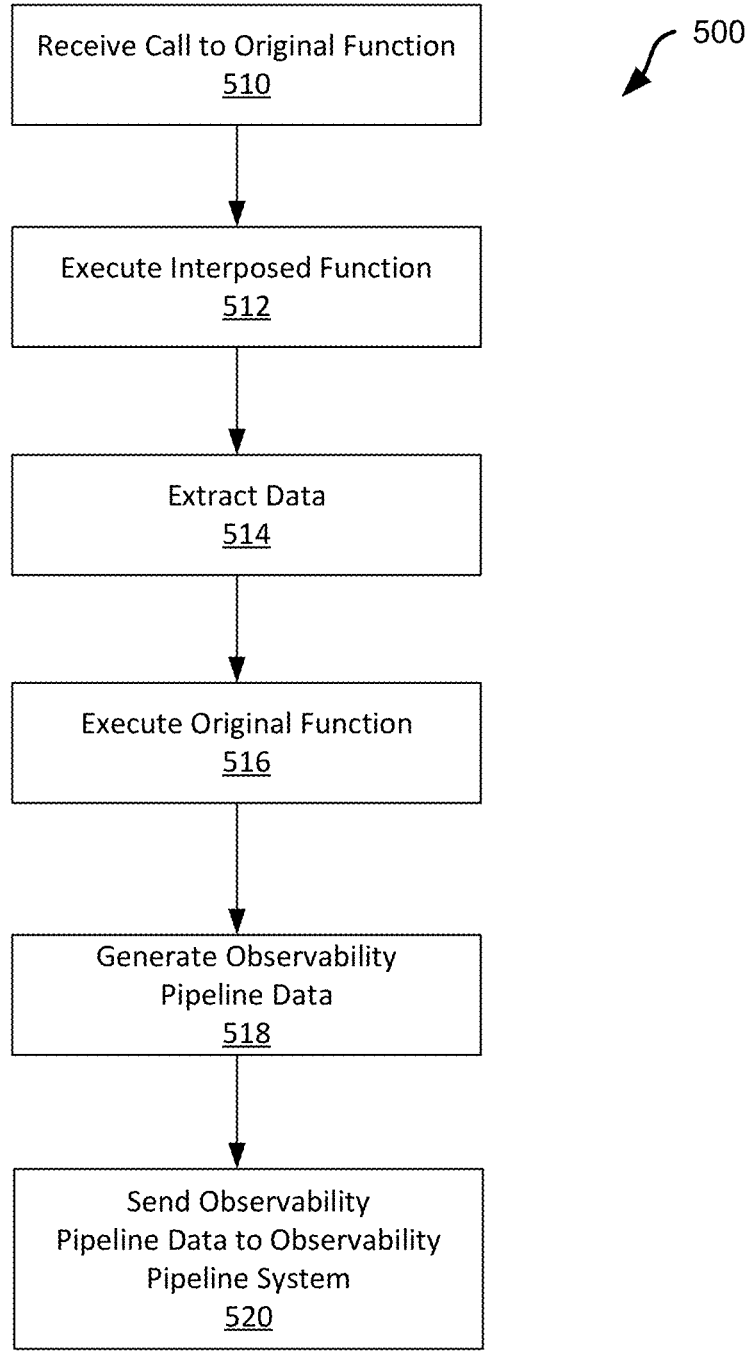
FIG. 5 is a flow diagram showing an example process that obtains observability pipeline data from interposed functions.

Interposed function wrappers may be made available to the application 116, as shown in FIGS. 3, 4, and 5. In the example shown in FIG. 1, For example, the function wrappers may be made available to the application 116 through library preloading, function hooking, GOT hooking, or other mechanisms.

The data destinations 104 can include multiple user devices, servers, databases, analytics systems, data storage systems, or a combination of these and other types of computer systems. The data destinations 104 can include, for example, log analytics platforms, time series databases (TSDBs), distributed tracing systems, security information and event management (SIEM) or user behavior analytics (UBA) systems, and event streaming systems or data lakes (e.g., a system or repository of data stored in its natural/raw format). The pipeline output data produced by the observability pipeline system 110 can be communicated to the data destinations 104 through the network 108.

The data storage 106 can include multiple user devices, servers, databases, or a combination of these and other types of data storage systems. Generally, the data storage 106 can operate as a data source or a data destination (or both) for the observability pipeline system 110. In some examples, the data storage 106 includes a local or remote filesystem location, a network file system (NFS), Amazon S3 buckets, S3-compatible stores, other cloud-based data storage systems, enterprise databases, systems that provides access to data through REST API calls or custom scripts, or a combination of these and other data storage systems. The pipeline output data, which may include the machine data from the data sources 102 as well as data analytics and other output from the observability pipeline system 100, can be communicated to the data storage 106 through the network 108.

The observability pipeline system 110 may be used to monitor, track, and triage events by processing the machine data from the data sources 102. The observability pipeline system 110 can receive an event data stream from each of the data sources 102 and identify the event data stream as pipeline input data to be processed by the observability pipeline system 110. The observability pipeline system 110 generates pipeline output data by applying observability pipeline processes to the pipeline input data and communicates the pipeline output data to the data destinations 104. In some implementations, the observability pipeline system 110 operates as a buffer between data sources and data destinations, such that all data sources send their data to the observability pipeline system 110, which handles filtering and routing the data to proper data destinations.

In some implementations, the observability pipeline system 110 unifies data processing and collection across many types of machine data (e.g., metrics, logs, and traces). The machine data can be processed by the observability pipeline system 110 by enriching it and reducing or eliminating noise and waste. The observability pipeline system 110 may also deliver the processed data to any tool in an enterprise designed to work with observability data. For example, the observability pipeline system 110 may analyze event data and send analytics to multiple data destinations 104, thereby enabling the systematic observation of event data for known conditions which require attention or other action. Consequently, the observability pipeline system 110 can decouple sources of machine data from data destinations and provide a buffer that makes many, diverse types of machine data easily consumable.

In some example implementations, the observability pipeline system 110 can operate on any type of machine data generated by the data sources 102 to properly observe, monitor, and secure the running of an enterprise's infrastructure and applications 116 while minimizing overlap, wasted resources, and cost. Specifically, instead of using different tools for processing different types of machine data, the observability pipeline system 110 can unify data collection and processing for all types of machine data (e.g., logs 204, metrics 206, and traces 208 shown in FIG. 2) and route the processed machine data to multiple data destinations 104. Unifying data collection can minimize or reduce redundant agents with duplicate instrumentation and duplicate collection for the multiple destinations. Unifying processing may allow routing of processed machine data to disparate data destinations 104 while adapting data shapes and controlling data volumes.

In an example, the observability pipeline system 110 obtains DogStatsd metrics, processes the DogStatsd metrics (e.g., by enriching the metrics), sends processed data having high cardinality to a first destination (e.g., Honeycomb) and processed data having low cardinality to a second, different destination (e.g., Datadog). In another example, the observability pipeline system 110 obtains windows event logs, sends full fidelity processed data to a first destination (e.g., an S3 bucket), and sends a subset (e.g., where irrelevant events are removed from the full fidelity processed data) to one or more second, different destinations (e.g., Elastic and Exabeam). In another example, machine data is obtained from a Splunk forwarder and processed (e.g., sampled). The raw processed data may be sent to a first destination (e.g., Splunk). The raw processed data may further be parsed, and structured events may be sent to a second destination (e.g., Snowflake).

The example observability pipeline system 110 shown in FIG. 1 includes a leader role 112 and multiple worker role 114. The leader role 112 leads the overall operation of the observability pipeline system 110 by configuring and monitoring the worker roles 114; the worker roles 114 receive event data streams from the data sources 102 and data storage 106, apply observability pipeline processes to the event data, and deliver pipeline output data to the data destinations 104 and data storage 106.

The observability pipeline system 110 may deploy the leader role 112 and a number of worker roles 114 on a single computer node or on many computer nodes. For example, the leader role 112 and one or more worker roles 114 may be deployed on the same computer node. Or in some cases, the leader role 112 and each worker role 114 may be deployed on distinct computer nodes. The distinct computer nodes can be, for example, distinct computer devices, virtual machines, containers, processors, or other types of computer nodes.

The user device 120, the observability pipeline system 110, or both, can provide a user interface for the observability pipeline system 110. Aspects of the user interface can be rendered on a display (e.g., the display 650 in FIG. 6) or otherwise presented to a user. The user interface may be generated by an observability pipeline application that interacts with the observability pipeline system 110. The observability pipeline application can be deployed as software that includes application programming interfaces (APIs), graphical user interfaces (GUIs), and other modules.

In some implementations, an observability pipeline application can be deployed as a file, executable code, or another type of machine-readable instructions executed on the user device 120. The observability pipeline application, when executed, may render GUIs for display to a user (e.g., on a touchscreen, a monitor, or other graphical interface device), and the user can interact with the observability pipeline application through the GUIs. Certain functionality of the observability pipeline application may be performed on the user device 120 or may invoke the APIs, which can access functionality of the observability pipeline system 110. The observability pipeline application may be rendered and executed within another application (e.g., as a plugin in a web browser), as a standalone application, or otherwise. In some cases, an observability pipeline application may be deployed as an installed application on a workstation, as an "app" on a tablet or smartphone, as a cloud-based application that accesses functionality running on one or more remote servers, or otherwise.

In some implementations, the observability pipeline system 110 is a standalone computer system that includes only a single computer node. For instance, the observability pipeline system 110 can be deployed on the user device 120 or another computer device in the computing environment 100. For example, the observability pipeline system 110 can be implemented on a laptop or workstation. The standalone computer system can operate as the leader role 112 and the worker roles 114 and may execute an observability pipeline application that provides a user interface as described above. In some cases, the leader role 112 and each of the worker roles 114 are deployed on distinct hardware components (e.g., distinct processors, distinct cores, distinct virtual machines, etc.) within a single computer device. In such cases, the leader role 112 and each of the worker roles 114 can communicate with each other by exchanging signals within the computer device, through a shared memory, or otherwise.

In some implementations, the observability pipeline system 110 is deployed on a distributed computer system that includes multiple computer nodes. For instance, the observability pipeline system 110 can be deployed on a server cluster, on a cloud-based "serverless" computer system, or another type of distributed computer system. The computer nodes in the distributed computer system may include a leader node operating as the leader role 112 and multiple worker nodes operating as the respective worker roles 114. One or more computer nodes of the distributed computer system (e.g., the leader node) may communicate with the user device 120, for example, through an observability pipeline application that provides a user interface as described above. In some cases, the leader node and each of the worker nodes are distinct computer devices in the computing environment 100. In some cases, the leader node and each of the worker nodes can communicate with each other using TCP/IP protocols or other types of network communication protocols transmitted over a network (e.g., the network 108 shown in FIG. 1) or another type of data connection.

In some implementations, the observability pipeline system 110 is implemented by software installed on private enterprise servers, a private enterprise computer device, or other types of enterprise computing infrastructure (e.g., one or more computer systems owned and operated by corporate entities, government agencies, other types of enterprises). In such implementations, some or all of the data sources 102, data destinations 104, data storage 106, and the user device 120 can be or include the enterprise's own computer resources, and the network 108 can be or include a private data connection (e.g., an enterprise network or VPN). In some cases, the observability pipeline system 110 and the user device 120 (and potentially other elements of the computer environment 100) operate behind a common firewall or other network security system.

In some implementations, the observability pipeline system 110 is implemented by software running on a cloud-based computing system that provides a cloud hosting service. For example, the observability pipeline system 110 may be deployed as a SaaS system running on the cloud-based computing system. For example, the cloud-based computing system may operate through Amazon® Web Service (AWS) Cloud, Microsoft Azure Cloud, Google Cloud, DNA Nexus, or another third-party cloud. In such implementations, some or all of the data sources 102, data destinations 104, data storage 106, and the user device 120 can interact with the cloud-based computing system through APIs, and the network 108 can be or include a public data connection (e.g., the Internet). In some cases, the observability pipeline system 110 and the user device 120 (and potentially other elements of the computer environment 100) operate behind different firewalls, and communication between them can be encrypted or otherwise secured by appropriate protocols (e.g., using public key infrastructure or otherwise).

Figure 2:
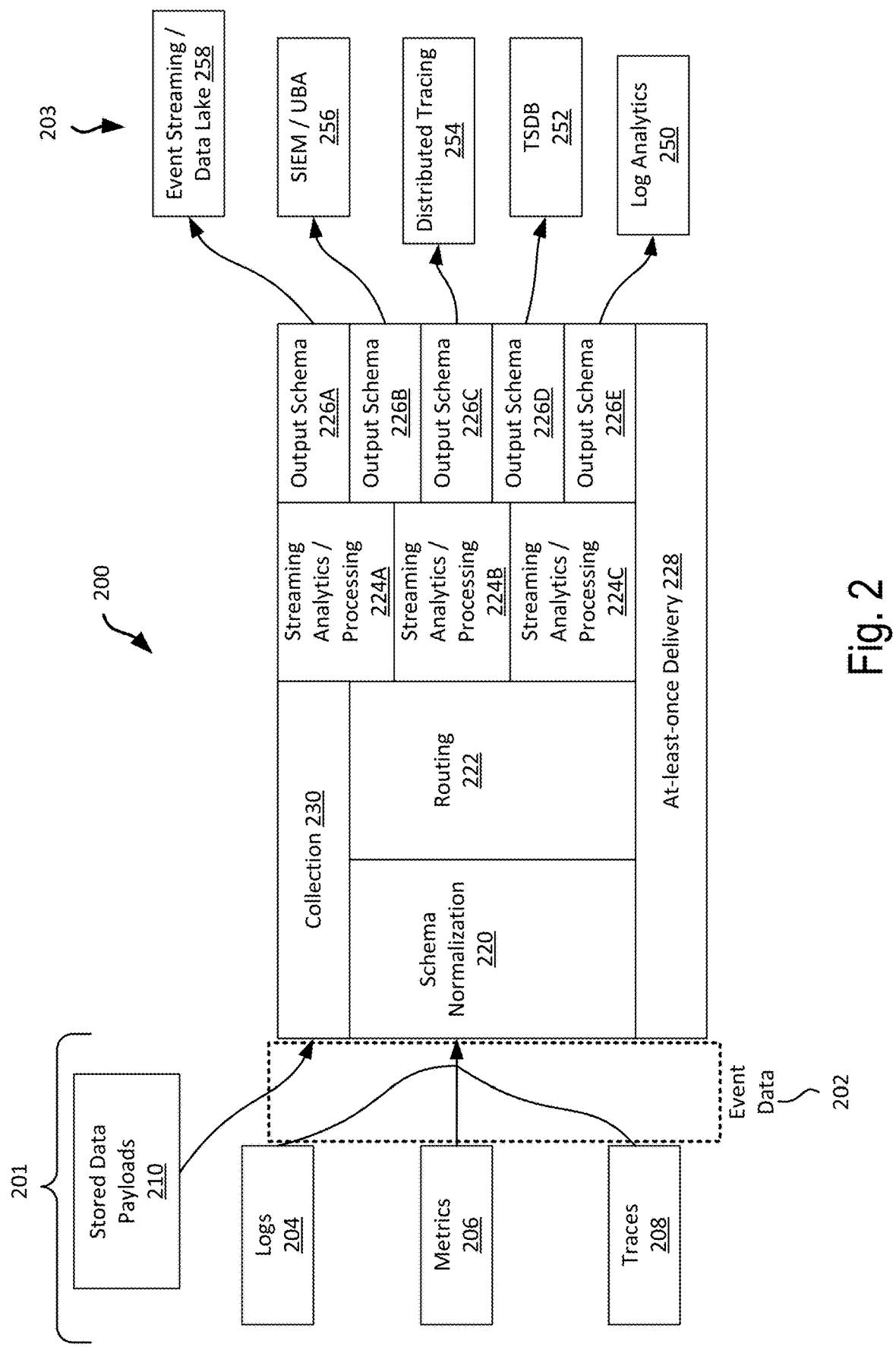
FIG. 2 is a block diagram showing aspects of an example observability pipeline system deployed in a worker role.

FIG. 2 is a block diagram showing aspects of an example observability pipeline process 200 that can be applied by a worker role in an observability pipeline system. For example, the observability pipeline process 200 may be performed by one or more of the worker roles 114 shown in FIG. 1 or a worker role in another observability pipeline system.

The example observability pipeline process 200 shown in FIG. 2 includes data collection 230, schema normalization 220, routing 222, streaming analytics and processing 224A, 224B, 224C, and output schematization 226A, 226B, 226C, 226D, 226E. The observability pipeline process 200 may include additional or different operations, and the operations of the observability pipeline process 200 may be performed as described with respect to FIG. 2 or in another manner. In some cases, one or more of the operations can be combined, or an operation can be divided into multiple sub-processes. Certain operations may be iterated or repeated, for example, until a terminating condition is reached. In some cases, one or more of the operations may receive pipeline input data 201 generated remotely, for example, by the execution of an interposed function.

As shown in FIG. 2, the observability pipeline process 200 is applied to pipeline input data 201 from data sources, and the observability pipeline process 200 delivers pipeline output data 203 to data destinations. The data sources can include any of the example data sources 102 or data storage 106 described with respect to FIG. 1, and the data destinations can include any of the example data destinations 104 or data storage 106 described with respect to FIG. 1.

The example pipeline input data 201 shown in FIG. 2 includes logs 204, metrics 206, traces 208, stored data payloads 210, and possibly other types of machine data. In some cases, some or all of the machine data can be generated by agents (e.g., Fluentd, Collectd, OpenTelemetry) that are deployed at the data sources, for example, on various types of computing devices in a computing environment (e.g., in the computing environment 100 shown in FIG. 1, or another type of computing environment). The logs 204, metrics 206, and traces 208 can be decomposed into event data 202 that are consumed by the observability pipeline process 200. In some instances, logs 204 can be converted to metrics 206, metrics 206 can be converted to logs 204, or other types of data conversion may be applied. In some cases, the logs 204, metrics 206, traces 208, and stored data payloads 210 that constitute the example pipeline input data 201, may be produced by interposed functions made available to an application 116 shown in FIG. 1. The interposed functions may produce data according to the systems and flows illustrated in FIGS. 3, 4, and 5.

In the example shown, the stored data payloads 210 represent event data retrieved from external data storage systems. For instance, the stored data payloads 210 can include event data that an observability pipeline process previously provided as output to the external data storage system.

The event data 202 are streamed to the observability pipeline process 200 for processing. Here, streaming refers to a continual flow of data, which is distinct from batching or batch processing. With streaming, data are processed as they flow through the system continuously (as opposed to batching, where individual batches are collected and processed as discrete units). As shown in FIG. 2, the event data from the logs 204, metrics 206, and traces 208 are streamed directly to the schema normalization process (at 220) without use of the collection process (at 230), whereas the event data from the stored data payloads 210 are streamed to the collection process (at 230) and then streamed to the schema normalization process (at 220), the routing process (at 222) or the streaming analytics and processing (at 224).

In some instances, event data 202 represent events as structured or typed key value pairs that describe something that occurred at a given point in time. For example, the event data 202 can contain information in a data format that stores key-value pairs for an arbitrary number of fields or dimensions, e.g., in JSON format or another format. A structured event can have a timestamp and a "name" field. Instrumentation libraries can automatically add other relevant data like the request endpoint, the user-agent, or the database query. In some implementations, components of the events data 202 are provided in the smallest unit of observability (e.g., for a given event type or computing environment). For instance, the event data 202 can include data elements that provide insight into the performance of the computing environment 100 to monitor, track, and triage incidents (e.g., to diagnose issues, reduce downtime, or achieve other system objectives in a computing environment).

In some instances, logs 204 represent events serialized to disk, possibly in several different formats. For example, logs 204 can be strings of text having an associated timestamp and written to a file (often referred to as a flat log file). The logs 204 can include unstructured logs or structured logs (e.g., in JSON format). For instance, log analysis platforms store logs as time series events, and the logs 204 can be decomposed into a stream of event data 202.

In some instances, metrics 206 represent summary information about events, e.g., timers or counters. For example, a metric can have a metric name, a metric value, and a low cardinality set of dimensions. In some implementations, metrics 206 can be aggregated sets of events grouped or collected at regular intervals and stored for low cost and fast retrieval. The metrics 206 are not necessarily discrete and instead represent aggregates of data over a given time span. Types of metric aggregation are diverse (e.g., average, total, minimum, maximum, sum-of-squares) but metrics typically have a timestamp (representing a timespan, not a specific time); a name; one or more numeric values representing some specific aggregated value; and a count of how many events are represented in the aggregate.

In some instances, traces 208 represent a series of events with a parent/child relationship. A trace may provide information of an entire user interaction and may be displayed in a Gantt-chart like view. For instance, a trace can be a visualization of events in a computing environment, showing the calling relationship between parent and child events, as well as timing data for each event. In some implementations, individual events that form a trace are called spans. Each span stores a start time, duration, and an identification of a parent event (e.g., indicated in a parent-id field). Spans without an identification of a parent event are rendered as root spans.

The example pipeline output data 203 shown in FIG. 2 include data formatted for log analytics platforms (250), data formatted for time series databases (TSDBs) (252), data formatted for distributed tracing systems (254), data formatted for security information and event management (SIEM) or user behavior analytics (UBA) systems 256, and data formatted for event streaming systems or data lakes 258 (e.g., a system or repository of data stored in its natural/raw format). Log analytics platforms are configured to operate on logs to generate statistics (e.g., web, streaming, and mail server statistics) graphically. TSDBs operate on metrics; example TSDBs include Round Robin Database (RRD), Graphite's Whisper, and OpenTSDB. Tracing systems operate on traces to monitor complex interactions, e.g., interactions in a microservice architecture. SIEMs provide real-time analysis of security alerts generated by applications and network hardware. UBA systems detect insider threats, targeted attacks, and financial fraud. Pipeline output data 203 may be formatted for, and delivered to, other types of data destinations in some cases.

In the example shown in FIG. 2, the observability pipeline process 200 includes a schema normalization module that (at 220) converts the various types of event data 202 to a common schema or representation to execute shared logic across different agents and data types. For example, machine data from various agents such as Splunk, Elastic, Influx, and OpenTelemetry have different, opinionated schemas, and the schema normalization module can convert the event data to normalized event data. Machine data intended for different destinations may need to be processed differently. Accordingly, the observability pipeline process 200 includes a routing module that (at 222) routes the normalized event data (e.g., from the schema normalization module 220) to different processing paths depending on the type or content of the event data. The routing module can be implemented by having different streams or topics. The routing module routes the normalized data to respective streaming analytics and processing modules. FIG. 2 shows three streaming analytics and processing modules, each applied to normalized data (at 224A, 224B, 224C); however, any number of streaming analytics and processing modules may be applied. Each of the streaming analytics and processing modules can aggregate, suppress, mask, drop, or reshape the normalized data provided to it by the routing module. The streaming analytics and processing modules can generate structured data from the normalized data provided to it by the routing module. The observability pipeline process 200 includes output schema conversion modules that (at 226A, 226B, 226C, 226D, 226E) schematize the structured data provided by the streaming analytics and processing modules. The structured data may be schematized for one or more of the respective data destinations to produce the pipeline output data 203. For instance, the output schema conversion modules may convert the structured data to a schema or representation that is compatible with a data destination. In some implementations, the observability pipeline process 200 includes an at-least-once delivery module that (at 228) applies delivery semantics that guarantee that a particular message can be delivered one or more times and will not be lost. In some implementations, the observability pipeline process 200 includes an alerting or centralized state module, a management module, or other types of sub-processes.

In the example shown in FIG. 2, the observability pipeline process 200 includes a collection module that (at 230) collects filtered event data from stored data payloads 210. For example, the stored data payloads 210 may represent event data that were previously processed and stored on the event streaming/data lake 258 or event data that were otherwise stored in an external data storage system. For example, some organizations have a high volume of data that is kept in storage systems (e.g., S3, Azure Blob Store, etc.) for warehousing purposes, or they may have event data that can be scraped from a REST endpoint (e.g., Prometheus). The collection module may allow organizations to apply the observability pipeline process 200 to data from storage, REST endpoints, and other systems regardless of whether the data has been processed by an observability pipeline system in the past. The data collection module can retrieve the data from the stored data payload 210 on the external data storage system, stream the data to the observability pipeline process 200 (e.g., via the schema normalization module, the routing module, or a streaming analytics and processing module), and send the output to any of the data destinations 230.

FIG. 3 is a block diagram of an example system 300 for extracting observability data from an application. In the example shown in FIG. 3, a shared library embodies the ability to extract details from an application during execution. In the example, an application includes one or more application threads 302. In the example, an application thread 302 examines one or both shared libraries "libpthread" 304 and "libc" 306 for a desired function. Finding it in "libc," the application thread 302 calls the function in the shared library "libc" 306. The function embodied in the shared library "libc" 306 executes and then returns to the calling function in application thread 302. When a function is interposed, an application thread 302 again makes a call to a function that is normally embodied in "libc" 306. However, in the example shown in FIG. 3, the function call is resolved by an interposition library 308 that contains a function having the same name as the original function. The function in the interposition library extracts details related to the operation of the function in "libc" 306 and then calls the original function in "libc" 306. In this manner, the function embodied in "libc" 306 has been interposed.

The processes performed by the example system 300 in FIG. 3 may include additional or different operations, and the operations may be performed in another order. In some cases, one or more of the operations can be combined, or an operation can be divided into multiple sub-processes. Certain operations may be iterated or repeated, for example, until a terminating condition is reached.

The operation of the system 300 shown in FIG. 3 may be performed on a computer system, for example the computer data sources 102 in FIG. 1. The computer system can operate in a computing environment that includes data sources, applications, data destinations, data storage, an observability pipeline system, and a user device. The computing environment may include additional or different features, and the elements of the computing environment may operate as described with respect to FIG. 3 or in another manner. In some cases, the data sources, data destinations, data storage, observability pipeline system, and user device are implemented as the data sources 102, data destinations 104, data storage 106, the observability pipeline system 110, applications 116, and user device 120 shown in FIG. 1, or they may be implemented in another manner.

In another example, the application thread 302 calls the function "fwrite" to write data to a file. In this example, "fwrite" is embodied in "libc" 306, which is a shared library provided by an operating system distribution. The example interposition library 308 also contains a function named "fwrite." In some cases, the addresses of "fwrite (libc)" and "fwrite (interposition library)" are determined by the dynamic loader. In this example, the operating system is configured to enable preloading of the interposition library 308. As a result of preloading, the address of "fwrite" is obtained from the interposition library 308. Consequently, the application thread 302 calls function "fwrite" in the interposition library 308. Function "fwrite" in the interposition library performs its operations, e.g., determining metrics, and calls the function "fwrite" in "libc" 306.

In some implementations, information extracted from interposed functions is stored in an in-memory queue 310 and metrics 314 and events 316 are exported by a separate thread of the application. Information is exported to external systems for analysis over an external connection 318. In the example, the periodic thread 312 executes on a configured period. Thread 312 reads from an in-memory queue 310 and exports the metrics 314 and events 316 as formatted data. In the example, metrics 314 are exported in either StatsD or NDJSON format. Also, in the example, events 316 are exported in NDJSON format. The external connection 318 can be a network connection, a file, or another type of connection.

FIG. 4 is an example software architecture 400 of a shared library utilized as part of a mechanism exposing observability data from within applications. The example software architecture 400 includes a preloading feature that may allow a user-specified shared library 404 to be loaded before all other shared libraries 406 required by a dynamic executable 402.

The example architecture 400 shown in FIG. 4 may include additional or different elements, and the elements may be deployed in another order. In some cases, one or more of the elements can be combined, or an element can be divided into multiple sub-components.

In the example shown in FIG. 4, the dynamic loader 408 resolves external addresses for a dynamic executable 402, using the symbol namespaces of libraries 406 as they are loaded. It loads the symbol namespace in library load order. Therefore, if an interposition library 404 includes a function named "fwrite," the symbol table 410 will include an entry for "fwrite." The address for "fwrite" is determined when the library 406 is loaded, and the linker uses that address to resolve references to "fwrite."

In the example shown in FIG. 4, a dynamic application 402 using "fwrite" has a dependency on an application library 406, "libc.so," because that is where the function "fwrite" is resolved when the application is built. The dynamic loader will resolve the address to "fwrite" when "libc.so" 203 is loaded. Where an interposition library 404 is preloaded before an application library 406, e.g., "libc.so," and the preloaded library defines a function "fwrite," the dynamic loader 408 will resolve the address of "fwrite" to the preloaded interposition library 404 instead of the application library "libc.so" 406, thus interposing "fwrite." The interposed fwrite function in the interposition library 404 then determines the address of libc.so:fwrite in the application library 406 and subsequently calls the original function.

FIG. 5 is a flow diagram showing an example process 500 that obtains observability pipeline data from interposed functions. The example process 500 shown in FIG. 5 can be performed by a computer system running one or more applications. For example, the process 500 may be performed by the data source 102 in FIG. 1, running the application 116 shown in FIG. 1.

The example process 500 may include additional or different operations, including operations performed by additional or different entities, and the operations may be performed in the order shown or in another order. In some cases, one or more of the operations shown in FIG. 5 are implemented as processes that include multiple operations, sub-processes, or other types of routines. Operations can be combined, performed in parallel, iterated or otherwise repeated, or performed in another manner.

In the example process 500, a data collection function is made available to an application or an application thread on a computer system, wherein the data collection function has the same name as an original function that is referenced by the application. For example, the data collection function can be made available to the application by library preloading, function hooking, or GOT hooking, or another method of interposition. The application may be statically or dynamically linked. The original function may exist in a library such as libpthread 304 or libc 306 of FIG. 3, or another type of library.

In some implementations, an application is attached by a supervising application, e.g., "ptrace" or another supervising application. In some examples, attaching allows a supervising application to take control of the execution of another application. In some cases, the supervising application pauses the application. In some examples, the supervising application then saves the state of the application, or application state. Application state can include the contents of registers, the program counter, program variables, and other attributes particular to the execution of the application code on the computer system.

In some examples, the supervising application causes bootstrapping code to be loaded into the application. In an example, the bootstrapping code is loaded into an available page in memory. In another example, additional memory is allocated to accommodate the bootstrapping code. In yet another example, loading the bootstrapping code can include an examination of the application's memory map by the supervising application to locate a page of executable memory in the memory map. In some cases, this page of memory can contain existing program code. In some examples, the supervising application saves the contents of the page. The contents may be stored to another area of memory, to disk, or to another location.

In some cases, the supervising application overwrites the contents of the page with the bootstrapping code and causes the bootstrapping code to be executed. In some examples, the bootstrapping code is executed by modifying the values of the registers of the computer system's CPU. In some examples, as a result of the execution of the bootstrapping code, an interposition library is loaded into the application. In some cases, the interposition library includes the interposition functions. The interposition functions are initialized and instantiated. In some examples, loading the library results in the execution of a constructor function that initializes and instantiates the interposed functions. In some implementations, the interposition functions serve as data collection functions.

In some cases, the supervising application restores the application state of the application by replacing the overwritten page of memory with its original contents. The supervising application can also restore any modified registers with their values prior to the pause. In some examples, the supervising application allows the process to continue executing from the point at which it was stopped when the attach occurred. In an example, the supervising application then detaches from the application. In some examples, interposed functions in the application begin to capture and emit details describing execution of the application.

At 510, the application, or contained application thread, receives a call to the original function for which the interposing function has been defined. The original application can be, for example, the application 116 of FIG. 1, and the application thread can be, for example, the application thread 302 of FIG. 3. The interposing function can be a data collection function that is configured to extract data from the application while the application is running on the computer system. In the example shown in FIG. 5, parameters intended to be passed to the original function are preserved and may be passed to the interposing function.

At 512, the interposed data collection function is executed. In some cases, the interposed data collection function is executed within an application thread of the application. As an example, the application thread may be the application thread 302 of FIG. 3, and the interposed data collection function may be obtained from an interposition library such as interposition library 308 of FIG. 3.

At 514, the interposed data collection function extracts data from the application. For instance, the data collection function may extract internal variables and data objects from the application. Examples of extractable data include log data written to a file, log data written to the console (STDIN or STDOUT), opening a network connection, establishing a network connection, closing a network connection, data packets sent to a network, data packets received from a network, opening a file, closing a file, writing to a file, reading from a file, data associated with making a DNS request or receiving a DNS response, data associated with making a HTTP request or receiving a HTTP response, detecting a protocol operation, extracting a payload from a network operation, and other operations.

Other examples of data extractable through interposition include encrypted payloads, HTTPS requests or responses, SQL statements received by a database server, RPC commands in a network operation, files referenced by an application, files modified by an application, inbound and outbound connections established by an application, local processes connected to an application, remote processes associated with a UNIX socket connection, and other forms of data.

The data may be placed in an in-memory queue such as the in-memory queue 310 of FIG. 3. Alternatively, the data may be stored to a file. Other methods for storage of the extracted data may be used. The extracted data may include logs, metrics, traces, data payloads, and other types of machine data. These forms of extracted data may be analogous to the logs 204, metrics 206, traces 208, stored data payloads 210 of FIG. 2.

At 516, the interposed data collection function transfers control to the original function, which then executes. In the example shown in FIG. 5, any parameters passed by the calling routine are passed to the original function. The original caller in the application or associated application threads may be unaware of the interposition and continue to execute as if the interposition never happened. The original function completes and returns control to the interposed function. The interposed function then completes, and returns control to the application, which may include returning an output to the application.

At 518, observability pipeline input data is generated by formatting the data that was extracted from the application at 514. Observability pipeline input data may include the pipeline input data 201 of FIG. 2. A reporting thread in the application can process the extracted data. Such a thread may be a periodic thread such as the periodic thread 312 of FIG. 3. The observability pipeline input data may include metrics and events such as the metrics 314 and events 316 of FIG. 3, or other types of data.

At 520, the observability pipeline data is sent to an observability pipeline system. The observability pipeline system may be the observability pipeline system 110 of FIG. 1, the observability pipeline system 200 of FIG. 2, or another type of observability pipeline system. The observability pipeline data may be communicated to the observability pipeline system over a network (e.g., the network 108 shown in FIG. 1) or in another manner.

FIG. 6 is a block diagram showing an example of a computer system 600 that includes a data processing apparatus and one or more computer-readable storage devices. The term "data-processing apparatus" encompasses all kinds of apparatus, devices, nodes, and machines for processing data, including by way of example, a programmable processor, a computer, a system on a chip, or multiple ones, or combinations, of the foregoing, e.g., processor 610. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g., computer program 624, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 610, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g., memory 620. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 640 provides power to the other components of the computer system 600. For example, the other components may operate based on electrical power provided by the power unit 640 through a voltage bus or other connection. In some implementations, the power unit 640 includes a battery or a battery system, for example, a rechargeable battery. In some implementations, the power unit 640 includes an adapter (e.g., an AC adapter) that receives an external power signal (from an external source) and converts the external power signal to an internal power signal conditioned for a component of the computer system 600. The power unit 640 may include other components or operate in another manner.

To provide for interaction with a user, operations can be implemented on a computer having a display device, e.g., display 650, (e.g., a monitor, a touchscreen, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser.

The computer system 600 may include a single computing device, or multiple computers that operate in proximity or generally remote from each other and typically interact through a communication network, e.g., via interface 630. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship to each other.

The example interface 630 may provide communication with other systems or devices. In some cases, the interface 630 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 630 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect, data extracted from interposed functions is provided to an observability pipeline as input.

In a first example, a data collection function is made available to an application running on a computer system. In some cases, the data collection function has the same name as an original function referenced by the application. In response to a call to the original function, the data collection function is executed on the computer system. Executing the data collection function comprises extracting data from the application. The original function is executed on the computer system and returns an output to the application. A reporting thread is executed in the application on the computer system. Executing the reporting thread includes formatting the extracted data to generate observability pipeline input data and sending the observability pipeline input data from the computer system to an observability pipeline system.

Implementations of the first example may include one or more of the following features. The data collection function can be made available to the application by preloading a library, the library including the data collection function. The library can be configured based on user input received through a command line user interface.

The original function can be included in a dynamically loaded library. Interposing the function comprises saving an address of the data collection function in a Global Offsets Table. Interposing the function may include placing a JMP instruction in a preamble of the original function.

The original function can be part of a statically linked executable. The original function is part of the application.

The observability pipeline system input data may include metrics, logs, and events. The observability pipeline system processes the observability pipeline input data by applying schema normalization to the formatted data to generate normalized data, routing the normalized data to a streaming analytics and processing module, structured output data from the normalized data by operation of the streaming analytics and processing module, and applying output schemas to the structured output data to generate observability pipeline output data for a plurality of external data destinations.

The observability pipeline system can be deployed on a distributed computer system.

The observability pipeline system can be deployed on a standalone computer system comprising a single computer.

In a second example, an observability pipeline system includes one or more computer processors that perform one or more operations of the first example. In a third example, a non-transitory computer-readable medium comprises instructions that are operable when executed by data processing apparatus to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
   making a data collection function available to an application on a computer system;
   in response to a call to an original function:
      executing the data collection function on the computer system, wherein executing the data collection function comprises extracting data from the application; and
      executing the original function on the computer system, wherein executing the original function returns an output to the application; and
   executing a reporting thread in the application on the computer system, wherein executing the reporting thread comprises:
      generating observability pipeline input data by formatting the extracted data; and
      sending the observability pipeline input data from the computer system to an observability pipeline system.

2. The method of claim 1, wherein making the data collection function available to the application comprises preloading a library, the library including the data collection function.

3. The method of claim 2, comprising configuring the library based on user input received through a command line user interface.

4. The method of claim 1, wherein the original function is included in a dynamically loaded library.

5. The method of claim 1, wherein making the data collection function available comprises saving an address of the data collection function in a Global Offsets Table.

6. The method of claim 1, wherein making the data collection function available comprises placing a JMP instruction in a preamble of the original function.

7. The method of claim 1, wherein the original function is part of a statically linked executable.

8. The method of claim 1, wherein the original function is part of the application.

9. The method of claim 1, wherein the observability pipeline system input data comprises metrics, logs, and events.

10. The method of claim 9, wherein the observability pipeline system processes the observability pipeline input data by:
applying schema normalization to the formatted data to generate normalized data;
routing the normalized data to a streaming analytics and processing module;
generating structured output data from the normalized data by operation of the streaming analytics and processing module; and
applying output schemas to the structured output data to generate observability pipeline output data for a plurality of external data destinations.

11. The method of claim 1, wherein making the data collection function available to the application comprises:
attaching to the application by a supervising application;
saving a state of the application;
loading bootstrapping code;
executing the bootstrapping code;
as a result of executing the bootstrapping code, loading an interposition library, the interposition library comprising the data collection function;
instantiating the data collection function; and
restoring the state of the application.

12. The method of claim 11, wherein loading bootstrapping code comprises:
examining a memory map of the application;
locating a page of executable memory in the memory map;
saving the contents of the page of executable memory; and
writing the bootstrapping code to the page of executable memory.

13. A computer system comprising:
one or more processors; and
memory storing instructions that, when executed by the one or more processors, cause the one or more processors to perform operations comprising:
making a data collection function available to an application on the computer system;
in response to a call to an original function:
executing the data collection function on the computer system, wherein executing the data collection function comprises extracting data from the application; and
executing the original function on the computer system, wherein executing the original function returns an output to the application; and
executing a reporting thread in the application on the computer system, wherein executing the reporting thread comprises:
generating observability pipeline input data by formatting the extracted data; and
sending the observability pipeline input data from the computer system to an observability pipeline system.

14. The computer system of claim 13, wherein making the data collection function available to the application comprises preloading a library, the library including the data collection function.

15. The computer system of claim 14, wherein making the data collection function available to the application comprises configuring the library based on user input received through a command line user interface.

16. The computer system of claim 13, wherein making the data collection function available to the application comprises including the data collection function in a dynamically loaded library.

17. The computer system of claim 13, wherein making the data collection function available to the application comprises saving an address of the data collection function in a Global Offsets Table.

18. The computer system of claim 13, wherein making the data collection function available to the application comprises placing a JMP instruction in a preamble of the original function.

19. The computer system of claim 13, wherein making the data collection function available to the application comprises including the data collection function in a statically linked executable.

20. The computer system of claim 13, wherein making the data collection function available to the application comprises including the data collection function in a module of the application.

21. The computer system of claim 13, wherein extracting data comprises extracting metrics, logs, and events.

22. A non-transitory computer-readable medium comprising instructions that are operable when executed by data processing apparatus to perform operations comprising:
making a data collection function available to an application on a computer system;
in response to a call to an original function:
executing the data collection function on the computer system, wherein executing the data collection function comprises extracting data from the application; and
executing the original function on the computer system, wherein executing the original function returns an output to the application; and
executing a reporting thread in the application on the computer system, wherein executing the reporting thread comprises:
generating observability pipeline input data by formatting the extracted data; and
sending the observability pipeline input data from the computer system to an observability pipeline system.

* * * * *